US008644818B1

(12) United States Patent
Okmyanskiy et al.

(10) Patent No.: US 8,644,818 B1
(45) Date of Patent: Feb. 4, 2014

(54) RADIO ACCESS POINT DEVICE LOCATION VERIFICATION BASED ON WIRELESS USER DEVICE ROAMING HISTORY

(75) Inventors: Anton Okmyanskiy, Vancouver (CA); Jeffrey Antoline, Roswell, GA (US)

(73) Assignee: Cisco Technology, Inc., San Jose, CA (US)

( * ) Notice: Subject to any disclaimer, the term of this patent is extended or adjusted under 35 U.S.C. 154(b) by 266 days.

(21) Appl. No.: 12/904,592

(22) Filed: Oct. 14, 2010

(51) Int. Cl.
*H04W 4/00* (2009.01)
*H04W 36/00* (2009.01)
*H04W 24/00* (2009.01)

(52) U.S. Cl.
USPC ............... 455/432.1; 455/456.6; 455/436; 455/426.1; 370/331

(58) Field of Classification Search
USPC .................... 455/432.1, 456.6, 436, 426.1; 370/230.1, 331, 230
See application file for complete search history.

(56) References Cited

U.S. PATENT DOCUMENTS

| | | | |
|---|---|---|---|
| 6,754,488 B1 * | 6/2004 | Won et al. ............... | 455/424 |
| 2006/0193258 A1 * | 8/2006 | Ballai ...................... | 370/230 |
| 2007/0115886 A1 * | 5/2007 | Davis et al. .............. | 370/331 |
| 2007/0264996 A1 * | 11/2007 | Vikberg .................. | 455/426.1 |
| 2009/0104889 A1 * | 4/2009 | Lotvonen et al. ........ | 455/410 |
| 2009/0149194 A1 * | 6/2009 | Howard .................. | 455/456.1 |
| 2009/0180439 A1 * | 7/2009 | Tabery et al. ............ | 370/331 |
| 2009/0191866 A1 * | 7/2009 | Flore et al. .............. | 455/434 |
| 2009/0221287 A1 * | 9/2009 | Balasubramanian et al. | 455/434 |
| 2009/0280819 A1 * | 11/2009 | Brisebois et al. ........ | 455/446 |
| 2010/0002582 A1 * | 1/2010 | Luft et al. ............... | 370/230.1 |
| 2010/0041364 A1 * | 2/2010 | Lott et al. ............... | 455/404.1 |
| 2010/0062791 A1 * | 3/2010 | Wang et al. ............. | 455/456.1 |
| 2010/0087166 A1 * | 4/2010 | Agashe .................. | 455/411 |
| 2010/0120394 A1 * | 5/2010 | Mia et al. ............... | 455/404.2 |
| 2010/0203890 A1 * | 8/2010 | Nagaraja et al. ........ | 455/436 |
| 2010/0210280 A1 | 8/2010 | Haynes et al. | |
| 2010/0309790 A1 * | 12/2010 | Polakos .................. | 370/241 |
| 2011/0117932 A1 * | 5/2011 | Breitbach et al. ........ | 455/456.1 |
| 2012/0033611 A1 * | 2/2012 | Wu ......................... | 370/328 |
| 2012/0122492 A1 * | 5/2012 | Zhou et al. .............. | 455/456.6 |

* cited by examiner

*Primary Examiner* — Meless N Zewdu
*Assistant Examiner* — Jean Chang
(74) *Attorney, Agent, or Firm* — Edell, Shapiro & Finnan, LLC (57) ABSTRACT

Techniques are provided to detect when a radio access point device in a wireless cellular communication network is operating at a location other than its expected location. Roaming history data is obtained for wireless user devices in a wireless cellular communication network with respect to base transceiver stations each configured to serve a corresponding coverage area at a fixed known location and with respect to radio access point devices each configured to serve a corresponding relatively smaller coverage area in the wireless cellular communication network than a macro base transceiver station. Radio access point devices are also readily movable from one location to another location. The roaming history data of wireless user devices is analyzed against expected locations of radio access point devices to determine when a radio access point device is operating at a location other than its expected location.

24 Claims, 5 Drawing Sheets

┌─ 210
Collect or receive UE roaming history data containing
location update records and UE measurement reports and store in central database
(e.g., data is pushed to central database)

↓

Analyze roaming history data of UEs to determine when a RAP device is operating in a ─ 220
location other than its expected location

↓

Generate alert regarding one or more RAPs determined to be in wrong location and/or generate ─ 230
command to deactivate service for the one or more RAPs in the wrong locations

FIG. 4

Time difference between T1 and T2 is less than physically practical for UE-1 user to travel from San Jose to Los Angeles.

Generate alert that RAP-1 is in wrong location.

FIG. 5

Time difference between T1 and T2 is less than physically practical for UE-4 user to travel from St. Louis to Los Angeles.

Generate alert that RAP-4 is in wrong location.

FIG. 6

RADIO ACCESS POINT DEVICE LOCATION VERIFICATION BASED ON WIRELESS USER DEVICE ROAMING HISTORY

TECHNICAL FIELD

The present disclosure relates generally to wireless cellular communication networks and to verifying locations of radio access point devices operating in a wireless cellular communication network.

BACKGROUND

Femtocell is an emerging technology targeted for 3G/4G technologies such as the Universal Mobile Telecommunication System (UMTS), Code Division Multiplex Access (CDMA) systems, WiMax™ systems and Long Term Evolution (LTE) systems. Femtocells access points (AP) are radio access point devices that serve as mini cell tower devices to improve coverage of service to wireless user devices and offload mobile infrastructure of the mobile service provider by utilizing a subscriber's backhaul connection. Radio access points are by their nature readily movable from one location to another.

When activating radio access point device service, a wireless cellular communication service provider needs to verify location of the device to ensure that it radiates on correct licensed frequencies for a given area. A common location verification scheme involves use of global positioning system (GPS) techniques as well as a scan of the radio frequency neighborhood for signals from macro cell base transceivers ("towers") whose locations are known.

However, many subscribers need to deploy radio access point device in locations where neither GPS lock nor macro signal detection can be obtained. Such scenarios typically result in support calls to the service provider after the subscriber fails to achieve service activation. This results in both aggravated subscribers who are legitimately trying to activate a radio access point device and also leaves a loophole to those who are attempting to activate an unauthorized radio access point device.

DESCRIPTION OF EXAMPLE EMBODIMENTS

Overview

Techniques are provided to detect when a radio access point device in a wireless cellular communication network is operating at a location other than its expected location. Roaming history data is obtained for wireless user devices in a wireless cellular communication network with respect to base transceiver stations each configured to serve a corresponding coverage area at a fixed known location and with respect to radio access point devices each configured to serve a corresponding relatively smaller coverage area in the wireless cellular communication network. Radio access point devices are readily movable from one location to another location. The roaming history data of wireless user devices is analyzed against expected locations of radio access point devices to determine when a radio access point device is operating at a location other than its expected location.

Example Embodiments

Figure 1:
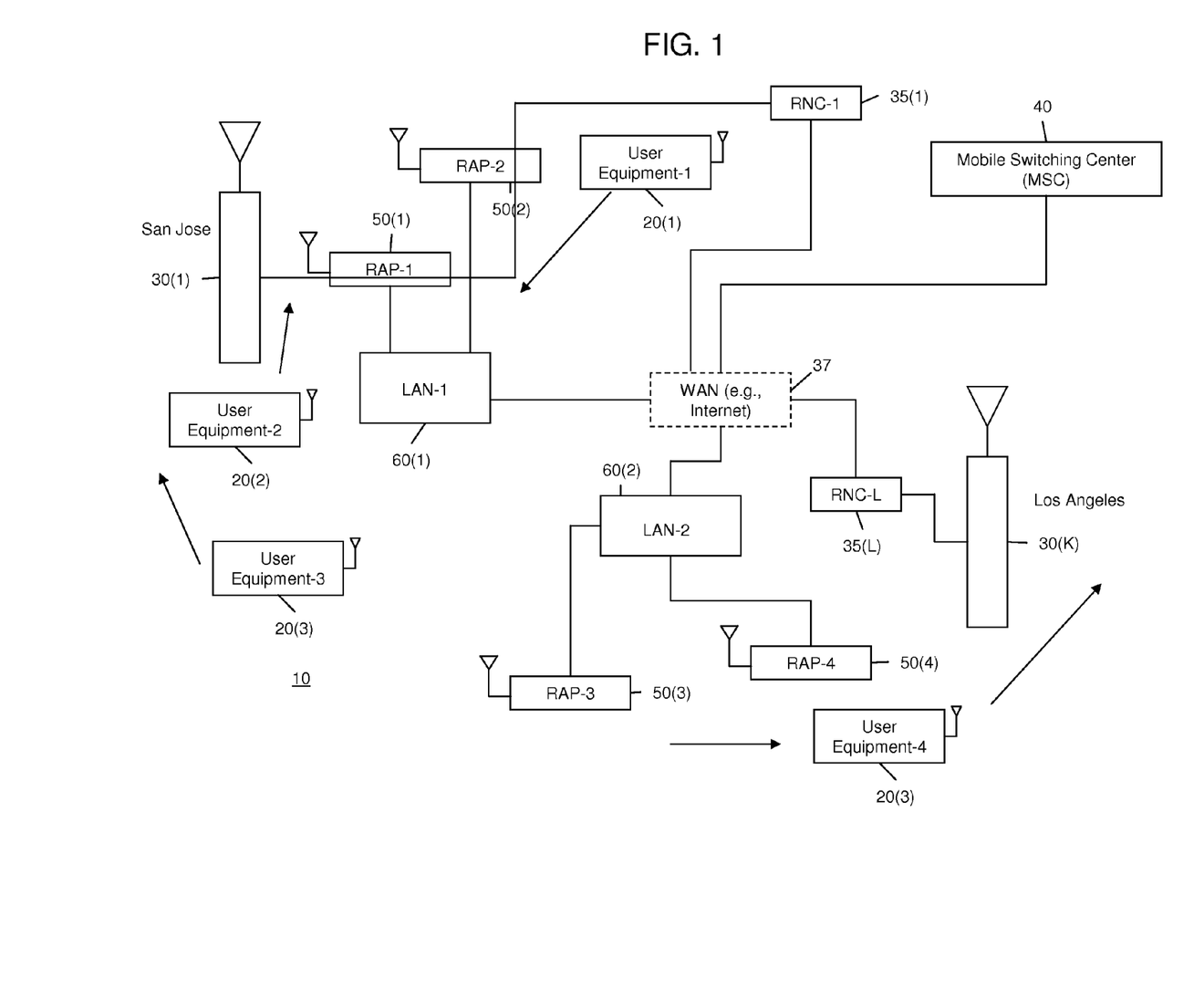
FIG. 1 is an example of a block diagram of components in a wireless cellular communication network that are configured to verify locations of radio access point devices based on data derived from movement of user devices in the network.

Referring first to FIG. 1, a block diagram is provided showing infrastructure components in a wireless cellular communication network 10. The network 10 includes several infrastructure elements that are configured to manage operations for the network 10 and to facilitate certain operations described herein. The network 10 is a wide area wireless cellular communication network, such as one that is built according to the "3G" wireless communication standard specifications. The network 10 is designed to provide a variety of voice and data services to wireless user devices. Examples of wireless user devices are shown at reference numerals 20(1)-20(4). Wireless user devices are also referred to herein as User Equipment (UE) in accordance with 3G terminology.

In order to serve wireless user devices, there are long range or "macro" cell base transceiver stations that are configured to serve relatively large coverage areas (measured in miles or km). Examples of macro cell base transceiver stations are shown at 30(1)-30(K). Macro base transceiver stations are by their nature relatively large and fixed at a given location.

The macro base transceiver stations are controlled by radio network controllers. Examples of radio network controllers (RNCs) are shown at reference numerals 35(1)-35(L). The RNCs 35(1)-35(L) communicate with a mobile switching center (MSC) 40 via a wide area network (WAN), e.g., the Internet shown at reference numeral 37. The RNCs 35(1)-35(L) also interface voice calls to a public telephone network (not shown) and interface voice or data sessions to the Internet 37.

Efforts have been made to improve the delivery of wireless services to UEs when they are out of range of a macro cell base transceiver station, such as when the wireless user devices are located within a building for example. Wireless service to UEs located within large buildings becomes degraded because the user device has difficulty receiving a signal from the base transceiver station even if the building is well within the coverage area of the base station. Accordingly, wireless transceiver devices with relatively small coverage areas (and serving capacities) are deployed inside buildings. Depending on their coverage area and serving capacities, these wireless transceiver devices are referred to as "femto" cell or "pico" cell access point devices. For simplicity and generality, the term radio access point (RAP) device is meant to refer to a wireless transceiver device that is configured to serve wireless client devices over a relatively small coverage area and with generally less capacity as compared to a macro base transceiver station. RAP devices are, by their nature, quite portable and readily movable from one location to another. Another term for a RAP device is a "micro" or "mini" base transceiver station. Examples of RAP devices are shown at reference numerals 50(1)-50(4). In 3G terminology, these RAP devices are referred to Home NodeB (HNodeB) devices and the base transceiver stations are referred to as NodeB devices. Again, the RAP devices are configured to provide the same type of wireless services to client devices when the wireless client devices are out of range of a macro base transceiver station. The relatively small coverage area of a RAP device is measured in terms of hundreds of feet or meters and the capacity (the number of wireless user devices that a RAP device can serve) is much more limited than a macro base transceiver station.

The RAP devices may be deployed within or near a building (e.g., small or large business enterprise or a home) and are connected to a wired local area network (LAN), which are in turn connected to the Internet 37. For example, RAP devices 50(1) and 50(2) are connected to a first LAN 60(1) and RAP devices 50(3) and 50(4) are connected to a second LAN 60(2). There may be several more RAP devices, but for simplicity they are not shown in FIG. 1. The voice or data sessions supported by a RAP device is routed to the appropriate MSC via the Internet 37.

There are multiple RAP devices deployed in different locations throughout areas where coverage is desired for the wireless network. RAP devices act as mini cellular radio transceiver towers (base stations) in that they operate in licensed spectrum just like the larger and fixed cellular base transceiver stations. However, since RAP devices are by their nature movable from one location to another, deployment and service activation of RAP devices involves location verification in order to ensure compliance with regulatory requirements.

Techniques are provided herein to detect when a RAP device is in the wrong location, that is, when it is operating at a location that is different from its configured expected operating location. Roaming history data is obtained for UEs in a wireless cellular communication network with respect to base transceiver stations that are each configured to serve a corresponding coverage area at fixed known locations and with respect to RAP devices that are each configured to serve a corresponding relatively smaller coverage area and are, by their nature, readily movable from one location to another. The roaming history data is analyzed against expected locations of RAP devices and known locations of base transceiver stations to determine that a particular radio access point device is operating in a location other than its expected location. A RAP device whose location is verified may be used as a reference (much like a fixed macro base transceiver station) for determining whether another RAP device is operating at a location other than its expected/configured location. A RAP device's location is verified when, through various techniques, it is determined to be operating at the location where it is configured or expected to operate at the time that it was sold to a customer or upon reconfiguration by provisioning equipment in the network 10. A RAP device whose location is verified may be considered, for purposes of the descriptions herein, a base transceiver station whose location is known even though a RAP device does not have the coverage area and capacity of macro base transceiver station. Thus, the term base transceiver station without the descriptor "macro" is meant to cover macro base transceiver stations as well as RAP devices whose locations are known and verified.

FIG. 1 shows that UE 20(1) moves near RAP device 50(1) and continues on. UE 20(2) moves near macro base transceiver station 30(1) and then near RAP device 50(1). UE 20(3) moves near macro base transceiver station 30(1). Macro base transceiver station 30(1) is located in San Jose, Calif. UE 20(4) moves near RAP device 50(3), then RAP device 50(4) and then near macro base transceiver station 30(K). Macro base transceiver station 30(K) is located in Los Angeles, Calif.

Figure 2:
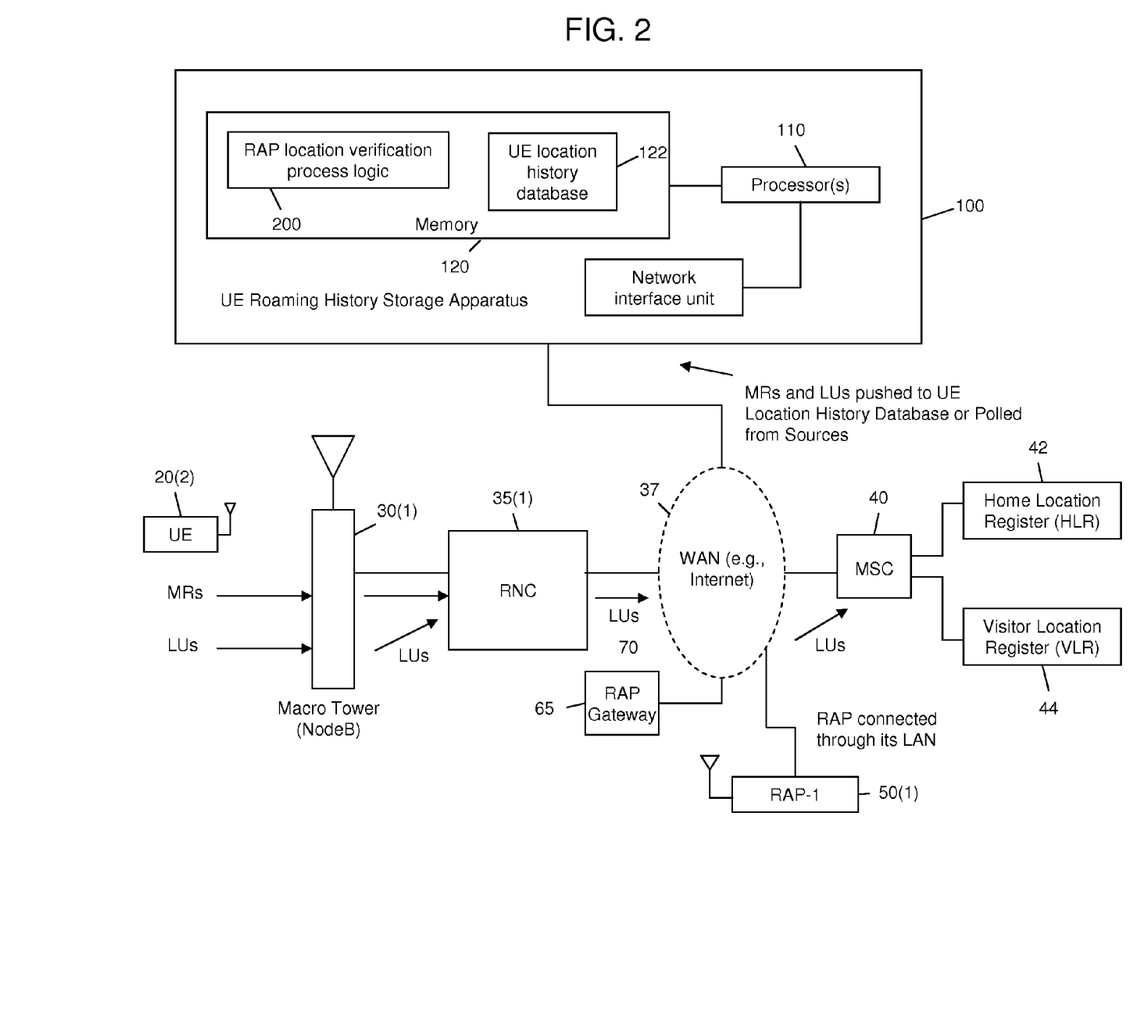
FIG. 2 is an example of a diagram depicting the flow of roaming data related to wireless user devices in the network to an apparatus where the data is collected as roaming history data for analysis to verify locations of radio access point devices.

Reference is now made to FIG. 2. FIG. 2 illustrates a portion of the network 10 and also shows how data relating to roaming of UEs is collected into logs or histories for analysis. As a UE roams around the network 10, it generates data reflecting its roaming activity. A first type of roaming related data are location updates (LUs). A LU occurs in a standard message called a Location Update Request initiated by a UE through the macro base transceiver station or RAP device that is serving it.

The coverage area of a cellular radio network is usually divided into location areas or regions. Location areas are comprised of one or several radio cells. Each location area is given a unique number within the network, called a Location Area Code (LAC). A LAC is used as a unique reference for the location of a wireless user device during a communication session (voice or data) in the wireless cellular communication network, and is also used to address the wireless user device in the case of an incoming call or other type of communication session for a UE in the wireless cellular communication network. The LAC forms a part of the Location Area Identifier (LAI) and is broadcast on the Broadcast Control Channel (BCCH) by a base station (macro base transceiver station or RAP device).

The UE sends the LAC contained in signals received from and broadcast by a RAP device or macro base transceiver station and therefore does not contain the actual cell identifier (Cell ID) of the macro base transceiver station (NodeB) or RAP device (HNodeB) that is serving the UE. A NodeB sends the LU to its RNC, which then sends it to the MSC. The RNC may also be able to identify the NodeB from which the LU is sent. In the example shown in FIG. 2, the UE 20(2) sends a Location Updating Request message through the macro base transceiver station 30(1), which in turn sends the LU to the RNC 35(1). The RNC 35(1) sends it, via the Internet 37, to the MSC 40. The MSC 40 has storage capabilities associated with it including a Home Location Register (HLR) 42 and Visitor Location Register (VLR) 44.

A second type of data related to the movement/roaming of UEs is a Measurement Record (MR). The UE sends MRs according to instructions/schedule from the radio access network, e.g., the RNCs. UEs make measurement records when they detect and receive signals from neighboring NodeBs and HNodeBs while being served by another NodeB or HNodeB. The MRs are part of the information used to determine when and to which NodeB or HNodeB service for a UE should be handed off as the UE roams. MRs are received by the NodeB or HNodeB that is serving a UE.

The HLR is the definitive database of mobile subscriber information for a wireless carrier's network. It contains service profiles and checks the identity of a local UE. The VLR is a network database that holds information about roaming UEs. Of all the information the HLR and VLR stores about each UE, the Location Area Identity (LAI), which includes a LAC, identifies under which base transceiver station the UE is currently present, which is used for call setup for UEs. In this way, the macro base transceiver stations that serve UEs at any given time is tracked. A LAC may correspond to potentially many macro base transceiver stations or RAP devices. In general, all devices (macro and RAP) are considered when finding a UE under a given LAC. Information is stored at the UE roaming history storage apparatus 100 that indicates or cross references LACs to geographical areas served by the LACs so that knowledge of a LAC detected by a UE can be linked to a geographical area where the UE detected the LAC.

In view of the foregoing, the UE roaming related data may be collected in several places, including NodeBs, RNCs, VLR and the MSC. MRs can be collected from the RNCs and NodeBs and LUs can be collected from NodeBs, RNCs and the HLR at the MSC.

When a UE is served by a RAP device and sends a Location Update Request, the RAP sends forwards the LU for that UE to a RAP Gateway device, an example of which is shown at 65. The RAP Gateway device 65 serves as an access controller for multiple RAP devices (one of which is shown at 50(1)) to interface the voice and data sessions with UEs served by those RAP devices to the MSC and Serving Global Packet Radio Network (GPRS) Support Node (SGSN). In addition, a UE may generate a MR for signals received from a RAP device and as explained above, the MR made by the UE for that RAP device is sent by the macro base transceiver station that is serving that UE.

Thus, when UE comes across a base transceiver station with a better signal strength, it may send a LU indicating the LAC of the base transceiver station if it is different from a LAC it previously sent. Conversely, the UE may generate a LU when it is camped on a base transceiver station and may generate a MR from signals it receives from a base transceiver station when it is camped on another base transceiver station of a nearby RAP device.

Also shown in FIG. 2 is a UE roaming history storage apparatus 100 that stores the UE roaming history data (logs) for UEs in the network. More specifically, the UE roaming history storage apparatus 100 comprises one or more processors 110, memory 120 for storing the UE roaming history database 122 and a network interface unit 130. The network interface unit 130 enables communication over a network, e.g., Internet 37 shown in FIG. 1. In one form, the UE roaming history storage apparatus 100 polls the RNCs, HLR of the MSC, and/or NodeBs for LU data and MR data. In another form, the RNCs, MSCs and NodeBs are automatically configured to push the MR data and LU data to the UE roaming history storage apparatus 100 for storage in the UE roaming history database 122. The UE roaming history database 122 thus contains a log in terms of MR data and LU data pertaining to the movements of a plurality of UEs in a network.

The data in the UE roaming history database 122 is analyzed against expected locations of radio access point devices and known locations of macro base transceiver stations to determine that a radio access point device is operating at a location other than its expected location. To this end, the UE roaming history storage apparatus 100 may comprise RAP location verification process logic 200 stored in memory 120. The processor(s) 110 execute the process logic 200 to perform the analysis on the data stored in the UE roaming history database 122. In another form, the RAP location verification process logic 200 resides in an apparatus that is remote from the UE roaming history database 122 and the data stored in the database 122 is remotely accessed in order to perform the analysis of the RAP location verification process logic 200.

The processor 110 is a data processing device, e.g., a microprocessor, microcontroller, systems on a chip (SOCs) processing device, or other fixed or programmable logic. The controller 110 interfaces with the memory 120 that may be any form of random access memory (RAM) or read only memory (ROM) or other machine (computer or processor) readable tangible (non-transitory) memory medium that stores data and instructions used for the techniques described herein.

The functions of the processor 110 may be implemented by a processor or computer readable tangible memory medium encoded with instructions or by logic encoded in one or more tangible media (e.g., embedded logic such as an application specific integrated circuit (ASIC), digital signal processor (DSP) instructions, software that is executed by a processor, etc.), wherein the memory 120 stores data used for the computations or functions described herein (and/or stores software or processor instructions that are executed to carry out the computations or functions described herein). Thus, in one form, the operations described herein may be embodied in one or more computer readable storage media encoded with software comprising computer executable instructions that, when the software is executed, is operable to perform the operations described herein.

Shown in Table 1 is a representation of the data stored in the UE roaming history database 122.

TABLE 1

| UE Identifier | Location (Lat/Long) | Timestamp |
|---|---|---|
| 123456890 | 42.297814/−71.076014 | Jan. 15, 2010 12:23:20 |
| 223456890 | 33.164565/−76.176722 | Jan. 15, 2010 15:13:05 |
| 323456890 | 13.224565/−70.644343 | Jan. 15, 2010 16:23:12 |

The UE roaming history database 122 stores data comprising a UE identifier for each UE, Location and Timestamp. The UE identifier is any identifier unique to each UE, such as an International Mobile Station Identifier (IMSI). The LU may contain a temporary IMSI (TMSI) instead of IMSI. In this case, a translation is made from the TMSI to IMSI via the VLR/HLR or by requesting the IMSI from the UE.

The Location is, in one example, the Cell ID of a macro base transceiver station (NodeB) and the RAP ID, e.g., media access control (MAC) address of the RAP device (HNodeB). In another example, the Location may be a LAC or a group of cells. The form of the Location ID may depend on an implementation. For example, LUs comprise a LAC obtained by the UE from a broadcast from the NodeB (or HNodeB), and not the actual Cell ID of the NodeB on which UE has appeared. However, the NodeB itself may send the update to UE roaming history database 122 and identifies itself with its Cell ID, as explained above. The MR may also contain a LAC.

Thus, the Location identifies the NodeB or HNodeB for the LU or MR and may comprise a Cell ID or LAC. The Cell ID can be translated to exact known location (latitude/longitude). A LAC is assigned to a geographical area, the size of which depends on a network deployment, as explained above. Thus, the location of a NodeB can be derived from the corresponding LAC in a location update record.

An MR may contain a Cell ID of the macro base transceiver station sensed by a UE, but it is optional. However, the MR will contain a UARFCN, where UARFCN stands for UTRA Absolute Radio Frequency Channel Number, where UTRA stands for UMTS Terrestrial Radio Access and UMTS stands for Universal Mobile Telephony System. In other words, the MR contains an indication of the frequency of the signal on which the measurement is made. Frequencies are often regionalized, so the location of the source of the signal on which the MR is generated may be determined based on base transceiver station frequencies. Thus, the MRs may comprise data indicating a frequency of a signal received by a UE for a MR. Since frequencies are assigned to base transceiver stations operating in certain known geographical areas, the frequency of signal indicating in the MR is used as a means to identify the macro base transceiver station.

According to still a further variation, a MSC or other apparatus (e.g., the apparatus 100) in the network may send a message to a UE that is currently served by a RAP device, where the message is configured to instruct or command the UE to scan a defined spectrum (frequency bandwidth) that is different than the spectrum that the UE is normally configured to scan in order to allow the UE to detect signals from one or more base transceiver stations near the UE. Normally, the UE would be configured to scan in the spectrum based on its expected location, but in this case the UE is commanded to scan in other spectrum as well because the location of the RAP device is not verified. This will cause the UE to generate MRs that are conveyed via the RAP device for storage as part of the UE roaming history data and used to determine whether that RAP device is in the proper location.

Thus, the location update records thus comprise data identifying macro base transceiver stations on which UEs registered for service, data indicating when the UEs registered for service with macro base transceiver stations, data identifying RAP devices on which UEs registered for service, and data indicating when the UEs registered for service with RAP devices.

Similarly, the measurement reports comprise data indicating measurements made by UEs on signals received by UEs from macro base transceiver stations and RAP devices, the measurement reports indicating the macro base transceiver stations and RAP devices on which measurements are made and times of the measurements.

Figure 3:
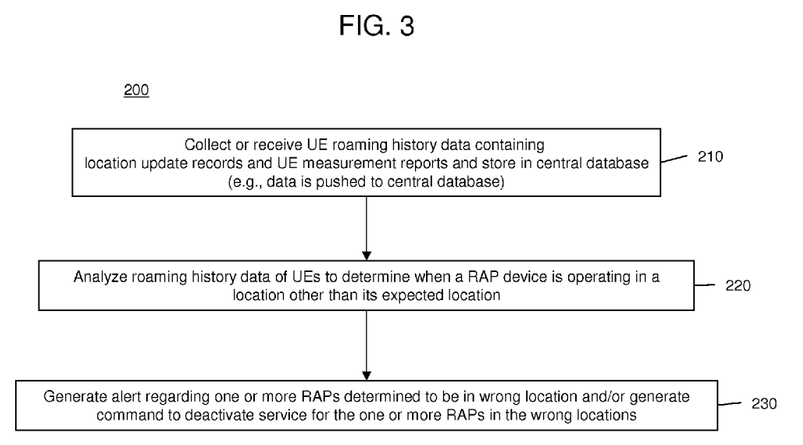
FIG. 3 is an example of a flow chart of operations performed at an apparatus to verify locations of radio access point devices.

Reference is now made to FIG. 3 for a description of the RAP location verification process logic 200. Generally, process logic 200 involves obtaining roaming history data of wireless user devices in a wireless cellular communication network with respect to macro base transceiver stations each configured to serve a corresponding coverage area and with respect to RAP devices each configured to serve a corresponding relatively smaller coverage area in the wireless cellular communication network than a macro base transceiver station and which radio access point devices are readily movable from one location to another location. The process logic 200 analyzes the roaming history data of wireless user devices against expected locations of RAP devices and known locations of macro base transceiver stations to determine that a radio access point device is operating at a location other than its expected location.

More specifically, at 210, UE LU records and UE MRs are collected/received and stored in central database. The data may be obtained by a polling mechanism from the UE Roaming History Storage Apparatus 100 or by a "pushing" mechanism whereby the various devices in the network shown in FIG. 2 are configured to push the LU records and UE MR data to the UE Roaming History Storage Apparatus 100. The LU records and MRs over a period of time are saved as a log or history. The LU and MRs over a period of time are referred to collectively herein as "roaming history data".

At 220, over a given period of time, e.g., a day or a week or perhaps shorter periods of time, the roaming history data is analyzed against expected locations of RAP devices identify determine whether one or more RAP devices are in the wrong location, that is, a RAP device is operating at a location other than its expected location. The expected location is the RAP device was provisioned to operate when it was sold to a user.

At 230, when a RAP device is determined to be operating at a location other than its expected location, an alert is generated indicating that one or more RAP devices are determined to be operating in a wrong location. A command may be generated to deactivate service for the one or more RAP devices in the wrong locations.

There are several indicators to search for when analyzing the roaming history data to detect when a RAP device is operating at a wrong location.

Figure 4:
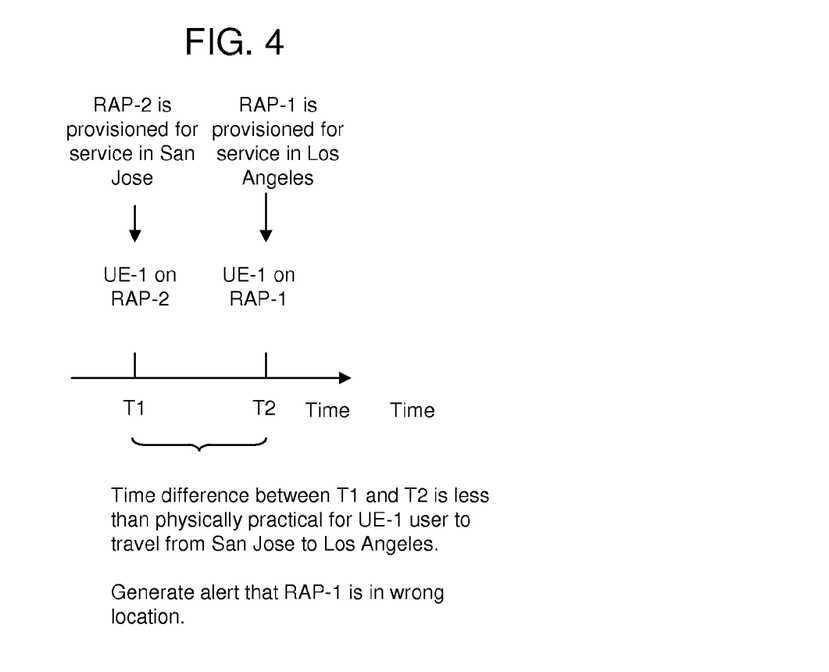
FIGS. 4-6 illustrate examples of a first set of scenarios for detecting that a radio access point device is operating at the wrong location.
Figure 5:
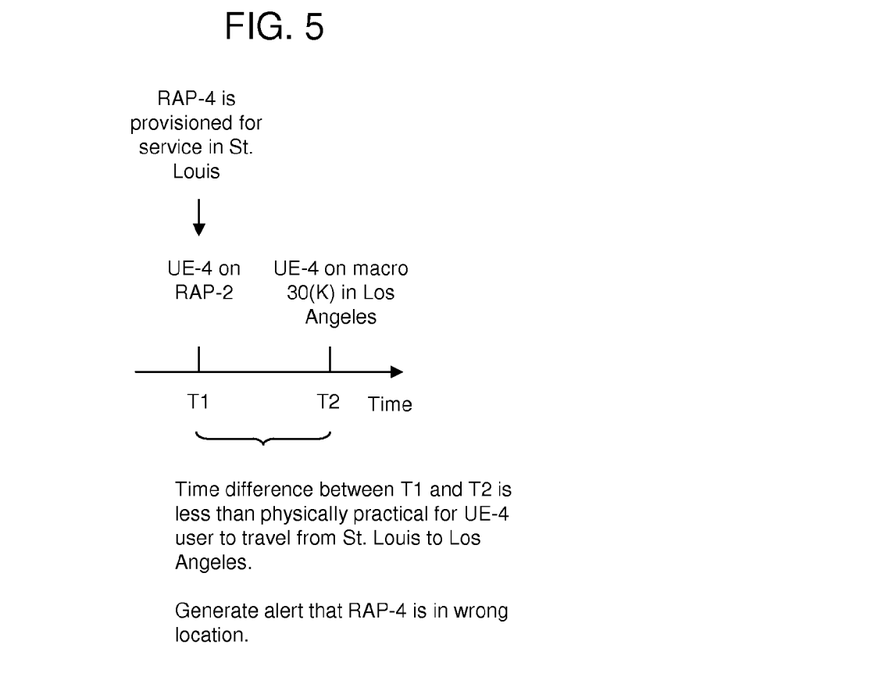
Figure 6:
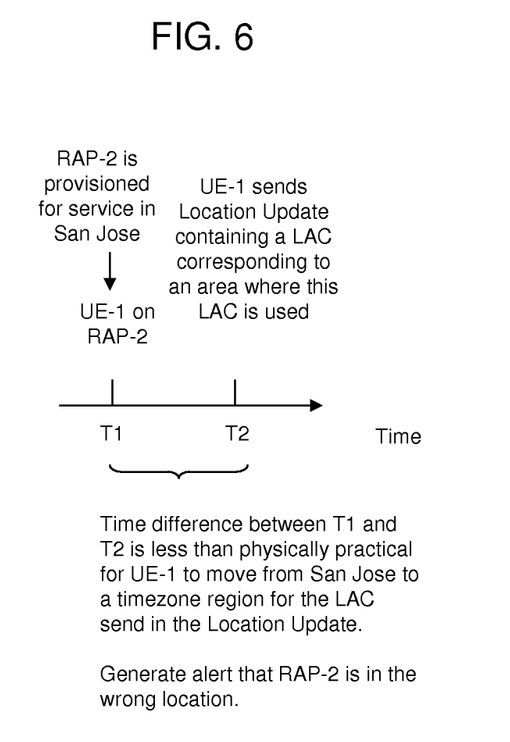

Reference is now made to FIGS. 4, 5 and 6 (also with reference to FIG. 1) for a description of a first set of example scenarios. FIG. 4 shows the scenario where a UE was registered for service with a given RAP device (referred to arbitrarily as a "first RAP device") and within a period of time registers for service at another RAP device (referred to arbitrarily as a "second RAP device") whose known and verified location is sufficiently distant from the expected location of the first RAP device such that it is not physically possible for the UE to move between the expected location of the first RAP device and the known location of the second RAP device within that period of time. In the example of FIG. 4, RAP-2 is provisioned for service in San Jose and RAP-1 is provisioned for service in Los Angeles. Thus, the expected location for RAP-2 is in San Jose and the expected location for RAP-1 is in Los Angeles. The location of RAP-2 is verified, a priori, as being the correct expected location of RAP-2. At time T1, UE-1 was registered for service with RAP-2 and then at time T2, UE-1 was registered for service with RAP-1. The data for this movement of UE-1 indicates that the time difference between T1 and T2 is less than physically practical for UE-1 user to travel from San Jose to Los Angeles. RAP-1 is therefore determined to be operating in the wrong location.

FIG. 5 shows another example similar to FIG. 4, but in this case, a UE was registered for service with a first RAP device and within a period of time registers for service at a macro base transceiver station whose known location is fixed and is sufficiently distant from the expected location of the first RAP device such that it is not physically possible for the UE to move between the expected location of the RAP device and the known location of the macro base transceiver station within that period of time. In this example, RAP-4 is provisioned for service in St. Louis, Mo. At time T1, UE-4 was registered for service on RAP-4. At time T2, UE-4 was registered for service on macro base transceiver station 30(K) whose known location is in Los Angeles. Thus, it is determined that RAP-4 is operating at the wrong location since the period of time between T1 and T2 is not physically possible for UE-4 to move between St. Louis and Los Angeles.

FIG. 6 illustrates another example scenario in which a UE was registered for service on a first RAP device and within a period of time sends a location update containing a LAC assigned to a location that is sufficiently distant from the expected location of the first RAP device such that it is not physically possible for the wireless user device to move between the expected location and the location associated with the local area code contained in the location update request. For example, in FIG. 6, RAP-2 is provisioned for service in San Jose. At time T1, UE-1 was registered for service on RAP-2. At time T2, UE-1 sends a location update containing a LAC obtained from signals received by UE-1 from a macro base transceiver station whose known location is in a region different from where RAP-2 is expected to be located.

The set of scenarios depicted in FIGS. 4-6 are time-based in the sense that the timing between the related events is used to determine a situation that would not be physically possible unless a RAP device is operating in a location sufficiently distant from its expected location.

Turning back to FIG. 1, another set of example scenarios is now described. In these scenarios, timing of events is not directly relevant to detecting a RAP device operating in the wrong location. In a first scenario, a UE was registered for service with a first radio access point device and while registered for service with the first radio access point device the UE sends a measurement report for a signal that the wireless user device detects from a base transceiver station (macro or RAP device) whose known location is sufficiently distant from the expected location of the first radio access point device. This could not be possible unless the RAP device with which the UE is registered while it made the measurement report was operating at the wrong location. For example, in FIG. 1, UE-2 is registered for service on RAP-1 that is provisioned for service in San Jose. While registered for service on RAP-1, UE-2 sends a measurement report to RAP-1 that includes signals that UE-2 detected from broadcasts made by macro base transceiver station 30(1) or any other macro base transceiver station or RAP device that is known (and verified) to be in a region different from that of RAP-1. RAP-1 is therefore determined to be operating in the wrong location.

A variation to this scenario is as follows. A UE was registered for service with a base transceiver station (macro or RAP device) at a known and verified location and while registered for service with the macro base transceiver station the wireless user device sends a measurement report for a signal that the wireless user device detects from a first radio access point device whose expected location is sufficiently distant from the known and verified location of the base transceiver station. For example, in FIG. 1, UE-4 is registered for service on macro base transceiver station 30(K) whose known location is in Los Angeles. While registered for service with macro base transceiver station 30(K), UE-4 sends a measurement report to macro base transceiver station 30(K) that includes signals that UE-4 broadcast by RAP-4 that is expected to be in a different location (St. Louis). RAP-4 is therefore determined to be operating in the wrong location.

In the previous two example scenarios, the measurement reports from UE may identify the exact cell ID (macro or RAP device). This is optional in the standards, but has recently become more standard. Event if the exact cell ID is not contained in the measurement report, extrapolations can be made based on cell site reported frequency/scrambling code in the measurement reports to identify the cell (macro or RAP device). As explained above, since frequencies can be region-specific, the location can be derived from the frequency of the signal used for the measurement report.

Thus, the foregoing presents techniques to detect when a RAP device operating in a wireless cellular communication network (that spans relatively large geographical areas) is not at its expected or configured location.

The above description is intended by way of example only.

What is claimed is:

1. A method comprising:
obtaining roaming history data of wireless user devices in a wireless cellular communication network with respect to base transceiver stations each configured to serve a corresponding coverage area at a fixed known location and with respect to radio access point devices each configured to serve a corresponding relatively smaller coverage area in the wireless cellular communication network and which radio access point devices are readily movable from one location to another location, the roaming history data comprising:
   location update information comprising local area code information associated with location areas of the wireless user devices relative to the base transceiver stations in the network; and
   measurement record information comprising indications of frequencies of signals received by the user devices; and
analyzing the local area code information in the location update information and frequency information in the measurement record information of the roaming history data to determine a time between updates of the location update information and the measurement record information; and determining that a radio access point device is operating at a location other than its expected location when the determined time indicates that the updates of the location update information and the measurement record information would not be possible unless the radio access point is operating at the location other than its expected location.

2. The method of claim 1, wherein analyzing comprises analyzing the roaming history data to determine when a wireless user device was registered for service with a first radio access point device and within a period of time registers for service at a macro base transceiver station whose known location is fixed and is sufficiently distant from the expected location of the first radio access point device such that it is not physically possible for the wireless user device to move between the expected location and the known location within the period of time.

3. The method of claim 1, wherein analyzing comprises analyzing the roaming history data to determine when a wireless user device registers for service with a first radio access point device and within an period of time registers for service with a second radio access point device whose known and verified location is sufficiently distant from the expected location of the first radio access point device such that it is not physically possible for the wireless user device to move between the expected location and the known location within the period of time.

4. The method of claim 1, wherein obtaining comprises obtaining location update records for location update requests sent by wireless user devices, each location update request containing a location area code detected by a wireless user device from signals received from base station transceivers, each location area code serving as a unique reference for a location of a wireless user device during a communication session in the wireless cellular communication network, and wherein analyzing further comprises analyzing the roaming history data to determine when a wireless user device was registered for service on a first radio access point device and within a period of time sends a location update request containing a location area code assigned to a location that is sufficiently distant from the expected location of the first radio access point device such that it is not physically possible for the wireless user device to move between the expected location and the location associated with the local area code contained in the location update request.

5. The method of claim 1, wherein analyzing comprises analyzing the roaming history data to determine when a wireless user device was registered for service with a first radio access point device and while registered for service with the first radio access point device sends a measurement report for a signal that the wireless user device detects from a base transceiver station whose known location is sufficiently distant from the expected location of the first radio access point device.

6. The method of claim 1, wherein analyzing comprises analyzing the roaming history data to determine when a wireless user device was registered for service with a base transceiver station at a known and verified location and while registered for service with the base transceiver station the wireless user device sends a measurement report for a signal that the wireless user device detects from a first radio access point device whose expected location is sufficiently distant from the known and verified location of the base transceiver station.

7. The method of claim 1, wherein obtaining comprises obtaining location update records comprising data identifying base transceiver stations on which wireless user devices registered for service, data indicating when the wireless user devices registered for service with base transceiver stations, data identifying radio access point devices on which wireless user devices registered for service, and data indicating when the wireless user devices registered for service with radio access point devices.

8. The method of claim 7, wherein obtaining location update records comprises obtaining cell identifiers as identifiers of base transceiver stations, and further comprising determining locations of respective base transceiver stations from corresponding cell identifiers.

9. The method of claim 7, wherein obtaining location update records comprises obtaining location area codes in location update reports generated from broadcast signals received by wireless user devices from base transceiver stations, and further comprising determining locations of respective base transceiver stations from corresponding location area codes contained in the location update records and information indicating which geographic areas are served by the location area codes.

10. The method of claim 1, wherein obtaining comprises obtaining measurement reports indicating measurements made by wireless user devices on signals received by wireless user devices from base transceiver stations and radio access point devices, the measurement reports indicating the base transceiver stations and radio access point devices on which measurements are made and times of the measurements.

11. The method of claim 10, and further comprising sending a message to a wireless user device that is currently served by a radio access point device, the message configured to instruct the wireless user device to scan a defined spectrum other than a spectrum that the wireless user device is normally configured to scan in order to detect signals from one or more base transceiver stations.

12. The method of claim 10, wherein obtaining measurement reports comprises obtaining data indicating a frequency of a signal received by a wireless user device a base transceiver station in a measurement report, and further comprising identifying a base transceiver station whose signal is used for the measurement report based on the data indicating the frequency based on the knowledge of which frequencies are used in geographic areas.

13. The method of claim 1, and further comprising generating a command to deactivate a radio access point device from service when it is determined that it is operating a location other than its expected location.

14. An apparatus comprising:
a network interface unit configured to enable communications over a network;
a processor configured to be coupled to the network interface unit, the processor configured to:
obtain roaming history data of wireless user devices in a wireless cellular communication network with respect to base transceiver stations each configured to serve a corresponding coverage area at a fixed known location and with respect to radio access point devices each configured to serve a corresponding relatively smaller coverage area in the wireless cellular communication network and which radio access point devices are readily movable from one location to another location the roaming history data comprising: location update information comprising local area code information associated with location areas of the wireless user devices relative to the base transceiver stations in the network; and
measurement record information comprising indications of frequencies of signals received by the user devices; and
analyze the location area code information in the location update information and frequency information in the measurement record information of the roaming history data of wireless user devices to determine a time between updates of the location update information and the measurement record information; and
determine that a radio access point device is operating at a location other than its expected location when the determined time indicates that the updates of the location update information and the measurement record information would not be possible unless the radio access point is operating at the location other than its expected location.

15. The apparatus of claim 14, wherein the processor is configured to analyze by analyzing the roaming history data to determine when a wireless user device was registered for service with a first radio access point device and within a period of time registers for service at a macro base transceiver station whose known location is fixed and sufficiently distant from the expected location of the first radio access point device such that it is not physically possible for the wireless user device to move between the expected location and the known location within the period of time.

16. The apparatus of claim 14, wherein the processor is configured to analyze the roaming history data to determine when a wireless user device registers for service with a first radio access point device and within an period of time registers for service with a second radio access point device whose known and verified location is sufficiently distant from the expected location of the first radio access point device such that it is not physically possible for the wireless user device to move between the expected location and the known location within the period of time.

17. The apparatus of claim 14, wherein the processor is configured to obtain location update records for location update requests sent by wireless user devices, each location update recording comprising a location area code from broadcast signals received by wireless user devices from base station transceivers, each location area code serving as a unique reference for a location of a wireless user device during a communication session in the wireless cellular communication network, and to analyze the roaming history data to determine when a wireless user device was registered for service on a first radio access point device and within a period of time sends a location update request containing a location area code assigned to a location that is sufficiently distant from the expected location of the first radio access point device such that it is not physically possible for the wireless user device to move between the expected location and the location associated with the local area code contained in the location update request.

18. The apparatus of claim 14, wherein the processor is configured to analyze the roaming history data to determine when a wireless user device was registered for service with a first radio access point device and while registered for service with the first radio access point device sends a measurement report for a signal that the wireless user device detects from a base transceiver station whose known location is sufficiently distant from the expected location of the first radio access point device.

19. The apparatus of claim 14, wherein the processor is configured to analyze the roaming history data to determine when a wireless user device was registered for service with a base transceiver station at a known and verified location and while registered for service with the base transceiver station the wireless user device sends a measurement report for a signal that the wireless user device detects from a first radio access point device whose expected location is sufficiently distant from the known location of the base transceiver station.

20. A non-transitory computer readable medium storing instructions that, when executed by a processor, cause the processor to:

obtain roaming history data of wireless user devices in a wireless cellular communication network with respect to base transceiver stations each configured to serve a corresponding coverage area at a fixed known location and with respect to radio access point devices each configured to serve a corresponding relatively smaller coverage area in the wireless cellular communication network and which radio access point devices are readily movable from one location to another location, the roaming history data comprising:

location update information comprising local area code information associated with location areas of the wireless user devices relative to the base transceiver stations in the network; and measurement record information comprising indications of frequencies of signals received by the user devices; and analyze the location area code information in the location update information and frequency information in the measurement record information of the roaming history data to determine a time between updates of the location update information and the measurement record information; and determine that, a radio access point device is operating at a location other than its expected location when the determined time indicates that the updates of the location update information and the measurement record information would not be possible unless the radio access point is operating at the location other than its expected location.

21. The computer readable medium of claim 20, wherein the instructions that cause the processor to analyze comprise instructions that cause the processor to analyze the roaming history data to determine when a wireless user device was registered for service with a first radio access point device and within a period of time registers for service at a macro base transceiver station whose known location is fixed and is sufficiently distant from the expected location of the first radio access point device such that it is not physically possible for the wireless user device to move between the expected location and the known location within the period of time.

22. The computer readable medium of claim 20, wherein the instructions that cause the processor to analyze comprise instructions that cause the processor to analyze the roaming history data to determine when a wireless user device registers for service with a first radio access point device and within an period of time registers for service with a second radio access point device whose known and verified location is sufficiently distant from the expected location of the first radio access point device such that it is not physically possible for the wireless user device to move between the expected location and the known location within the period of time.

23. The computer readable medium of claim 20, wherein the instructions that cause the processor to analyze comprise instructions that cause the processor to analyze the roaming history data to determine when a wireless user device was registered for service with a first radio access point device and while registered for service with the first radio access point device sends a measurement report for a signal that the wireless user device detects from a base transceiver station whose known location is sufficiently distant from the expected location of the first radio access point device.

24. The computer readable medium of claim 20, wherein the instructions that cause the processor to analyze comprise instructions that cause the processor to analyze the roaming history data to determine when a wireless user device was registered for service with a base transceiver station at a known and verified location and while registered for service with the base transceiver station the wireless user device sends a measurement report for a signal that the wireless user device detects from a first radio access point device whose expected location is sufficiently distant from the known location of the base transceiver station.

\* \* \* \* \*